3,104,995
SOLID PROPELLENT COMPOSITIONS
William B. Reynolds and James E. Pritchard, Bartlesville, Okla., assignors to Phillips Petroleum Company, a corporation of Delaware
No Drawing. Filed Jan. 27, 1956, Ser. No. 561,943
13 Claims. (Cl. 149—19)

This invention relates to solid propellent compositions. In one of its more specific aspects this invention relates to solid propellent compositions comprising an oxidant, a polymeric material, a burning rate catalyst, and various compounding ingredients. In another of its more specific aspects this invention relates to a solid propellent composition containing a polymeric material of low acid content, low soap content, and low ash content.

This application is a continuation-in-part of our copending application Serial No. 284,447, filed April 25, 1952, now Patent No. 3,003,861.

This application is related to copending application Serial No. 470,371, filed November 22, 1954, by R. S. Hanmer and J. H. Carroll, now Patent No. 3,035,006.

We have now discovered that conjugated diene-vinylpyridine copolymers having Mooney values (ML–4) in the range between 15 and 30, an organic acid content not greater than 1.5 weight percent, a soap content not greater than 1 weight percent and an ash content not greater than 1.5 weight percent, can be employed as superior binders in solid propellent compositions. In addition to the copolymer, the propellent composition contains an oxidant, a burning rate catalyst, and various compounding ingredients. It is generally preferred that carbon black be present in the compositions although the presence of carbon black is not essential to the production of satisfactory propellent compositions. The amount of carbon black in the copolymer can be in the range of 0 to 35 parts by weight per hundred parts of the copolymer. Propellents containing these conjugated diene-vinylpyridine copolymers as binders have better ballistic and mechanical properties than similar propellent compositions in which low Mooney conjugated diene-styrene copolymers are employed as binders.

It is an object of this invention to provide an improved method for making solid propellent compositions containing copolymers of conjugated dienes and a heterocyclic nitrogen base.

A further object of this invention is the provision of a solid propellent composition containing a rubbery binder of low acid, low soap, and low ash content.

Other objects, advantages, and features of this invention will be apparent to one skilled in the art upon reading this specification.

The copolymers employed in the propellent compositions are prepared by emulsion polymerization at temperatures generally in the range between 0 and 140° F. Recipes such as the iron pyrophosphate-hydroperoxide either sugar-free or containing sugar, sulfoxylate and persulfate are applicable. In these recipes at least 5 parts by weight of emulsifier, and preferably 6 parts, are employed per hundred parts of monomer with as much as 9 parts being applicable. It is generally preferred that polymerization be continued to between 80 and 90 percent conversion. However, polymers prepared from 50 percent to quantitative conversion are applicable. Polymerization is effected under conditions so as to yield polymers havings a Mooney value (ML–4) in the range between 15 and 30. The electrolyte content in the polymerization system should be kept at a minimum and a surface active agent such as Daxad 11 (sodium salt of condensed alkyl aryl sulfonic acid) is generally used. A more stable latex is obtained when operating in this manner than in the absence of Daxad 11.

The conjugated dienes employed are those containing from 4 to 6 carbon atoms per molecule and include 1,3-butadiene, isoprene, 2-methyl-1,3-butadiene, 2,3-dimethyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable in the polymeric binders of this invention.

Instead of using a single conjugated diene, a mixture of conjugated dienes can be employed. Thus a mixture of 1,3-butadiene and isoprene can be employed as the conjugated diene portion of the copolymer.

The polymerizable heterocyclic nitrogen bases which are applicable for the production of the polymeric materials are those of the pyridine and quinoline series which are copolymerizable with a conjugated diene and contain one and only one

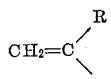

substituent wherein R is either hydrogen or a methyl group. That is, the substituent is either a vinyl or an alpha-methylvinyl (isopropenyl) group. Of these compounds, the pyridine derivatives are of the greatest interest commercially at present. Various substituted derivatives are also applicable but the total number of carbon atoms in the nuclear substituted groups, such as alkyl groups, should not be greater than 12 because the polymerization rate decreases somewhat with increasing size of the alkyl group. Compounds where the alkyl substituents are methyl and/or ethyl are available commercially.

These heterocyclic nitrogen bases have the formula

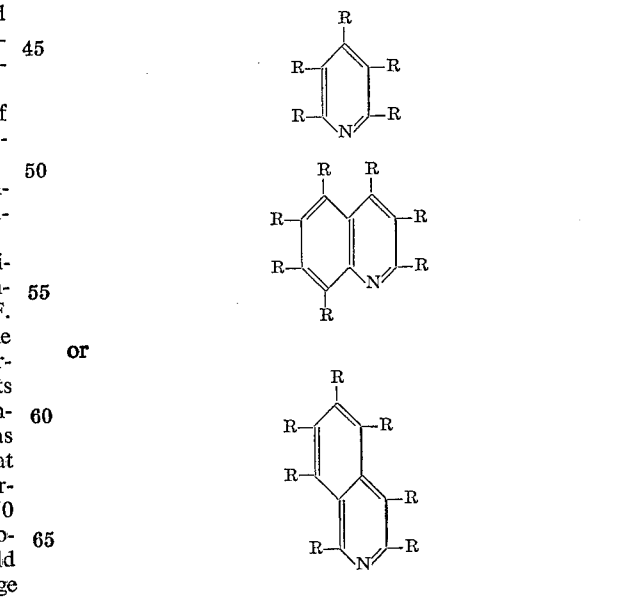

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 12. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6 - tetramethyl - 2-vinylpyridine; 3-ethyl-5-vinylpyridine; 2,6-diethyl - 4 - vinylpyridine; 2-isopropyl-4-nonyl-5-vinylpyridine; 2-methyl-5-undecyl-3-vinylpyridine; 2,4 - dimethyl-5,6-dipentyl-3-vinylpyridine; 2-decyl-5-(alpha-methylvinyl)pyridine; 2-vinyl-3-methyl-5-ethylpyridine; 2 - methoxy-4-chloro-6-vinylpyridine; 3-vinyl-5-ethoxypyridine; 2 - vinyl-4,5-dichloropyridine; 2-(alpha-methylvinyl) - 4 - hydroxy-6-cyanopyridine; 2 - vinyl-4-phenoxy-5-methylpyridine; 2-cyano-5-(alpha-methylvinyl)pyridine; 3 - vinyl-5-phenylpyridine; 2 - (para-methyl-phenyl)-3-vinyl-4-methylpyridine; 3-vinyl-5-(hydroxyphenyl)-pyridine; 2-vinylquinoline; 2-vinyl-4-ethylquinoline; 3 - vinyl-6,7-di-n-propylquinoline; 2-methyl-4-nonyl-6-vinylquinoline; 4 - (alpha-methylvinyl)-8-dodecylquinoline; 3 - vinylisoquinoline; 1,6-dimethyl-3-vinylisoquinolne; 2 - vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

The emulsifying agents employed in the emulsifying systems of this invention include lkali metal, alkyl aryl sulfonates such as sodium and potassium alkyl benzene sulfonates and alkyl toluene sulfonates; sulfates of long-chain aliphatic alcohols such as sodium lauryl sulfates; water-soluble salts of organic bases containing a hydrocarbon chain of 8 to 24 carbon atoms, e.g., hydrochloric, sulfonic, formic, and acetic acid salts of primary, secondary, and tertiary amines such as octyl amines, dodecyl amines, octadecyl amines, and octadecenyl amines; quaternary ammonium salts such as cetyl trimethyl ammonium bromides, and the like; the alkali metal and ammonium salts of fatty acids, such as sodium oleate, potassium stearate, potassium laurate, potassium myristate, potassium palmitate, the corresponding sodium salts and the corresponding ammonium salts; the ammonium and alkali metal salts of rosin acids such as the ammonium, sodium, and potassium salts of abietic acids, dihydroabietic acid and tetrahydroabietic acid; the non-ionic emulsifying agents such as the condensation products of mercaptans with ethylene oxide and the like.

In the polymerization of the conjugated dienes and vinylpyridines, the various activator or catalyst compositions employed in the various redox systems can be utilized. One system comprises an oxidizing agent, such as an organic hydroperoxide; a complexing agent, such as potassium pyrophosphate, a heavy metal salt; and, as an optional ingredient, a reducing sugar. One widely used activator or catalyst composition includes 0.01 to 0.5 part, per one hundred parts of monomer of an organic hydroperoxide, 0.02 to 0.7 part of a salt of a heavy metal, such as iron, nickel, vanadium and the like, 0.03 to 0.7 part of an alkali metal pyrophosphate and 0.0 to 1.0 part of a reducing sugar, such as dextrose, glucose, mannose, levulose, and the like.

Other activating or catalyst systems comprise diazothio ethers having the formula R—N=N—S—R′ where R and R′ are aromatic groups containing substituents such as alkyl, chloro, nitro, methoxy, sulfonic acid group, and R′ can also be cycloalkyl, substituted cycloalkyl, aliphatic and substituted aliphatic and the like. Another activator system comprises a peroxide or hydroperoxide and a polyalkylene polyamine.

Suitable hydroperoxides for use in redox systems such as iron pyrophosphate recipes, polyalkylene polyamine recipes and other recipes calling for an oxygen-yielding material are those having the formula

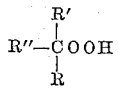

wherein each of R, R′, and R″ is an organic radical, or R′ and R″ together comprise a tetramethylene or pentamethylene group forming with the

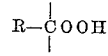

a cyclopentyl or cyclohexyl hydroperoxide. Each of R, R′ and R″ can be completely hydrocarbon in character, and can be of mixed character such as aralkyl, alkaryl and the like and can also have non-hydrocarbon substituents, some of which have the effect of making them more water-soluble and less oil (hydrocarbon)-soluble; particularly useful non-hydrocarbon substituents include oxygen in the form of hydroxy and ether groups, sulfur in similar groups (mercapto and thioether groups), and halogen atoms. Examples of such hydroperoxides include diisopropyl hydroperoxide (isopropyl[dimethyl]hydroperoxymethane), cumene hydroperoxide(phenyl[dimethyl]hydroperoxymethane), 1-methyl-1-hydroperoxycyclopentane, tetraline hydroperoxide, phenylcyclohexane hydroperoxide, octahydrophenanthrene hydroperoxide, diisopropylbenzene hydroperoxide (dimethyl[isopropylphenyl]hydroperoxymethane), methylethyl(ethoxyphenyl)hydroperoxymethane, methyldecyl(methylphenyl)hydroperoxymethane, dimethyl-decylhydroperoxymethane, methyl(chlorophenyl)phenylhydroperoxymethane, and tertiary-butylisopropylbenzene hydroperoxide (dimethyl[tertiary-butylphenyl]hydroperoxymethane).

Any modifying agent known to the art can be used in preparing the binder of the propellant composition of our invention. For example, sulfur containing compounds such as mercaptans, organic sulfides, thio and dithioic acids and salts, xanthogenic acids and salts, thiocarbamic acids and salts and the like, are suitable. The aryl and alkyl mercaptans are particularly suitable modifiers in emulsions systems and we have found the tertiary aliphatic $C_{12}$ to $C_{16}$ mercaptans of particular value, although mercaptans can be used which contain 3 to 16 carbon atoms per molecule. Mixtures or blends of mercaptans can also be used.

An electrolyte, when used, can be a water-soluble salt, such as an alkali metal chloride, or an alkali metal hydroxide. Suitable surface active agents include naphthalene sulfonic acid derivatives.

The emulsifier is used in an amount of 3 to 10 parts by weight per one hundred parts of monomer, and a decided improvement in latex stability is observed when the amount of emulsifier is maintained in the limits of 6 to 9 parts.

In general, the amount of oxidant varies within the range of 0.01 to 1 part by weight per one hundred parts of monomer, the amount of heavy metal salt varies between 0.02 and 1.5 part by weight per one hundred parts of monomer, and the amount of pyrophosphate varies from 0.03 to 1 part by weight per one hundred parts of monomer. The surface active agent can be present in the amount of 0 to 10 parts by weight, and the electrolyte in amounts of 0 to 0.3 part by weight.

The amount of modifier to be used will be that sufficient so as to provide a polymer with an uncompounded Mooney value of 15 to 30. However, it will be understood that latices of polymers having a higher or lower Mooney value can be blended so as to produce an uncompounded polymer having a Mooney value of 15 to 30.

In the preparation of the copolymers, the amount of conjugated diene will be in the range between 75 and 95 parts by weight per one hundred parts of monomer and the vinylpyridine component will be in the range between 25 and 5 parts.

In preparing the copolymers, the polymerization is carried out for a period, usually between 3 and 40 hours, sufficient so as to effect a conversion of from 50 to 100 percent of the monomeric materials. In commercial operations, it is important to maintain the conversion level within the range of 80 to 90 percent. At conversions of less than 80 percent, recovery of the large amount of unreacted heterocyclic nitrogen monomer is difficult and costly whereas conversions of greater than 90 percent require an excessive reaction time for commercial operations.

When the desired conversion has been obtained, a short stop material is added to stop the reaction. The amount of short stop employed, usually in the range of 0.1 to 1 part per one hundred parts of monomer, is sufficient to stop the reaction. Suitable short stopping agents include ditertiarybutylhydroquinone, dinitrochlorobenzene, and a 50–50 mixture of sodium dimethyl dithiocarbamate and sulfur in the form of sodium polysulfide. After the addition of the short stop and an anti-oxidant, if one is used, the latex is stripped so as to remove unreacted monomer. It is generally preferred that a defoaming agent be present in the recovery step.

If carbon black is to be used in the propellent composition, it is generally added as an aqueous slurry to the latex or carbon black may be milled directly into the dry polymer. Amounts up to 35 parts by weight per one hundred parts of the copolymer are applicable, however, between 10 and 30 parts are preferred. After the polymer-carbon black masterbatch is prepared, additional carbon black can be added on the mill if desired.

The latex or latex-carbon black mixture is coagulated by the addition of an acid. The acid, which can be any strong acid, such as sulfuric acid, is added in an amount sufficient to maintain a pH within the range of 1.5 to 3.5. One means of operation is to introduce separate streams of the latex or latex-carbon black mixture and acid into a common feed line which leads to a mixing pump and thence into the coagulation tank. Another means of operation is to feed the latex or latex-carbon black mixture and acid in separate streams into the coagulation tank. The materials are agitated during the coagulation step, and the pH of the serum is maintained in the range between 1.5 and 3.5.

It is a feature of the copolymer binder of the propellent composition of this invention that subsequent to the coagulation step the polymer crumb is washed with an aqueous solution of an alkaline material of sufficient basicity so as to form soluble salts of the organic acids present. For this step in our process, the pH of the serum should be maintained at 10 or above. For optimum results the temperature during this washing step is maintained in the range of 100 to 200° F. Washing is continued until the organic acid content of the polymer does not exceed 1.5 percent by weight, the soap content does not exceed 1 percent by weight, and the ash content does not exceed 1.5 percent by weight. Washing with the alkaline solution can be carried out in one or a series of steps using fresh solution in each step. Generally at least two steps are employed.

The alkaline materials include ammonium or alkali metal carbonate, ammonium or alkali metal bicarbonates and ammonium or alkali metal hydroxides. Solutions of alkali metal hydroxides particularly sodium hydroxide are preferred for this washing step.

When the organic acid, soap, and ash content are at or below the designated low levels, the processibility of the polymer is greatly improved. The removal of organic acids and soap, in particular, tends to make the crumb free-flowing thereby avoiding difficulties in the drying and processing steps. The removal of organic acids also has a beneficial effect on the burning rate of the propellent composition. Relatively small amounts of organic acids can be tolerated but larger amounts cause an appreciable decrease in burning rate.

Drying of the polymer crumb is facilitated by passing it through an extruder so as to remove a substantial amount of the water and then completing the step of water removal by tray drying. Alternatively tray drying alone can be used for the removal of water. We prefer to pass the polymer through an extruder because a polymer thus obtained has a lower ash content, the carbon black is more uniformly dispersed in the polymer, and a dryer product is more readily obtained by this method.

The solid propellent compositions of this invention are prepared by mixing a conjugated diene-vinylpyridine copolymer, as hereinbefore described, with a solid oxidant, and a burning rate catalyst together with any other necessary ingredients, such as curing agents, plasticizers, and the like and heating to effect curing of the composition.

Oxidants which are applicable in the solid propellent compositions of this invention include ammonium, alkali metal, and alkaline earth metal salts of nitric, perchloric, and chloric acids, and mixtures thereof. Ammonium nitrate and ammonium perchlorate are the preferred oxidants for use in the solid rocket fuels of this invention. Specific oxidants include sodium nitrate, potassium perchlorate, lithium chlorate, calcium nitrate, barium perchlorate, and strontium chlorate. Mixtures of oxidants are also applicable. In the preparation of the solid rocket propellent compositions, the oxidants are powdered to sizes preferably finer than 200 mesh. The amount of solid oxidant employed is usually a major amount of the total composition and is generally in the range between 50 and 90 percent by weight of the total mixture. If desired, however, less than 50 percent by weight of the oxidant can be used.

Commonly used combustion rate catalysts are ammonium dichromate, metal ferrocyanides and ferricyanides. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is a pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used, in the propellent compositions of this invention, are usually in the range of 1 to 60 parts per one hundred parts of rubbery polymer with from 5 to 50 parts being most frequently preferred.

Compounding agents are incorporated into the copolymer in producing the rubbery binder of the propellent compositions prepared according to the process of this invention. Quaternization agents including alkyl halides can be employed when the curing is to be effected by a quaternization reaction. In those cases wherein the curing is to be effected by vulcanization, compounding agents include vulcanization agents, vulcanization accelerators, oxidizers or plasticizers, stabilizers such as antioxidants, etc.

The vulcanization agents commonly employed are sulfur and zinc oxide.

Plasticizers include phthalic acid esters such as dibutyl phthalate and dioctyl phthalate; dibutyl sebacate, dibenzyl sebacate; coumarone resins, cuomarone-indene resins; pine tar; mineral oil; coal-tar fractions; phenol-formaldehyde resins; asphalt-base hydrocarbons; dibutyl carbitol formal; low molecular weight polyisobutylene; amylbiphenyl; benzophenone; etc.

Antioxidants which can be used in the curing of the copolymer materials of this invention include mixtures of a complex diarylamine-ketone reaction product and N,N'-diphenol-p-phenolene diamine; hydroquinone monobenzyl ether; phenyl-beta-naphthylamine; polymerized trimethyldihydroquinoline; di - paramethoxydiphenylamine; diphenylethylenediamine; alkylated polyhydroxy phenols; poly diaryl amines; etc.

Vulcanization accelerators which can be used in curing the polymers of the invention include butyraldehyde-butylideneaniline reaction products; acetaldehyde-aniline condensation products; piperidinium pentamethylene dithiocarbamate; N,N - dimethyl - S - tert - butylsulfenyl dithiocarbamate; benzothiazyl disulfide; zinc dibenzyl dithiocarbamate; zinc dibutyl dithiocarbamate; zinc diethyl dithiocarbamate; 2-mercaptobenzothiazole; dibutyl xanthogen disulfide; etc.

The propellant compositions of this invention are prepared by intimately mixing the dried copolymer crumb, the oxidizer, the burning rate catalyst, and the various compounding ingredients employed. The materials are mixed until they are consolidated into a homogeneous mass. This is usually done by adding all of the polymer and the compounding ingredients to the mixture and adding the blended oxidizer and burning rate catalyst to such mixture in increments. The blend of oxidizer and burning rate catalyst is usually added in from 3 to 6 increments although more or less can be employed when desired. Consolidation of the materials is usually obtained in from 5 to 20 minutes of intimate mixing. After all of the increments of the oxidizer and burning rate catalyst blend have been added, mixing is usually continued for from 5 to 20 minutes so as to insure complete consolidation of the materials in the mixture.

The intimately mixed and consolidated composition is then passed through an extruder and the extruded material is molded to form a grain by extrusion molding or by compression molding. The molded grains are cured for a period of 8 to 60 hours at a temperature in the range of 150° F. to 250° F. at atmospheric pressure or superatmospheric pressure.

The propellant can be molded into any desired shape and can be cured either in the mold or the grains can be removed from the mold and cured.

The following examples are intended to exemplify but not to unduly limit the invention.

EXAMPLE I

Two solid propellants were prepared using, in one case, a binder composition containing a 20 Mooney (ML–4) 90/10 butadien/2-methyl-5-vinylpyridine copolymer and, in the other, a binder composition containing a 17 Mooney (ML–4) 90/10 butadiene/styrene copolymer. Both copolymers were prepared by emulsion polymerization at 41° F. The propellant compositions were as follows:

| | Parts by weight |
|---|---|
| Ammonium nitrate | 82.5 |
| Binder composition | 17.5 |
| Milori blue [1] | 2 |

[1] A pigment similar to Prussian blue but having a red tint, prepared by the oxidation of a paste of potassium ferrocyanide and ferrous sulfate.

The butadiene/2-methyl-5-vinylpyridine binder composition was prepared in accordance with the following formulation:

| | Parts by weight |
|---|---|
| Copolymer | 100 |
| (Furnace black) | 20 |
| Benzophenone | 10 |
| Pentaryl A [1] | 10 |
| Butyl 8 [2] | 2 |
| Sulfur | 1.75 |
| Zinc oxide | 3 |
| Aerosol OT [3] | 1 |
| Flexamine [4] | 3 |

[1] Amylbiphenyl.
[2] Dithiocarbamate-type rubber accelerator.
[3] Dioctyl ester of sodium sulfosuccinic acid.
[4] Physical mixture containing 65 percent of a complex diarylamine-ketone reaction product and 35 percent of N,N'-diphenyl-p-phenylenediamine.

A masterbatch of the copolymer and carbon black was prepared first, the sulfur, Aerosol OT and Flexamine were introduced, then the benzophenone, Pentaryl A and Butyl 8 followed by the ammonium nitrate and finally the Milori blue and zinc oxide. The mixing was done in a Baker-Perkins dispersion blade mixer. Grains were produced by compression molding. Curing was effected at atmospheric pressure for 48 hours at 170° F. in a circulating air oven.

The butadiene/styrene binder composition was prepared in accordance with the following formulation:

| | Parts by weight |
|---|---|
| Copolymer | 100 |
| Philblack A (furnace black) | 20 |
| Benzophenone | 10 |
| Pentaryl A [1] | 10 |
| Stearic acid | 1.5 |
| Butyl 8 [1] | 2 |
| Sulfur | 1.75 |
| Zinc oxide | 3 |
| Flexamine [1] | 3 |
| Aerosol [1] | 1 |

[1] As hereinbefore described.

A masterbatch of the copolymer and carbon black was prepared first, the benzophenone, stearic acid, sulfur, zinc oxide and Flexamine were added, Pentaryl A was then introduced, then a dry blend of the ammonium nitrate, Aerosol OT and Milori blue, and finally the Butyl 8. The mixing was done in a Baker-Perkins dispersion blade mixer. A grain was produced by compression molding. Curing was effected at atmospheric pressure for 48 hours at 170° F. in a circulating air oven.

Tests were made on both cured propellant compositions. Results were as follows:

*Table I*

| | Butadiene/2-Methyl-5-Vinylpyridine | | | Butadiene/Styrene | | |
|---|---|---|---|---|---|---|
| | 70° F. | 170° F. | −75° F. | 70° F. | 170° F. | −75° F. |
| Tensile data: | | | | | | |
| Ultimate stress, p.s.i. | 285 | 166 | 956 | 186 | | |
| Ultimate elongation, percent | 22.3 | 21.3 | 20.3 | 6.8 | | |
| Modulus of elasticity, p.s.i. | 3,713 | 1,943 | 10,555 | 4,160 | | |
| Compression data: | | | | | | |
| Ultimate stress, p.s.i. | 724 | 324 | [1] >1,150 | 458 | 306 | [1] >1,200 |
| Ultimate deformation, percent | 25.8 | 28.0 | [2] >7.5 | 11.6 | 24.8 | [2] >6.7 |
| Modulus of elasticity, p.s.i. | 9,113 | 5,160 | 21,347 | 20,450 | 14,800 | 19,800 |

[1] Value when specimen exceeds load limits of testing machine.
[2] Value taken at 1000 p.s.i. stress.

The extrusion pressure, p.s.i. at 90° F., was determined for each propellant. Results were as follows:

| | |
|---|---|
| Butadiene/2-methyl-5-vinylpyridine | 7100 |
| Butadiene/styrene | 8600 |

*Example II*

A butadiene/2-methyl-5-vinylpyridine copolymer was prepared by emulsion polymerization at 41° F. in accordance with the following recipe:

| | Parts by weight |
|---|---|
| Water | 180 |
| Butadiene | 90 |
| 2-methyl-5-vinylpyridine [1] | 10 |
| Potassium fatty acid soap [2] | 6 |
| KOH | 0.1 |
| KCl | 0.1 |
| Daxad 11 [3] | 0.3 |
| K₄P₂O₇ | 0.33 |
| FeSO₄·7H₂O | 0.278 |
| Diisopropylbenzene hydroperoxide | 0.214 |
| Tert-dodecyl mercaptan | 0.45 |

BOOSTER RECIPE

| | |
|---|---|
| Water | 10 |
| K₄P₂O | 0.165 |
| FeSO₄·7H₂O | 0.139 |
| Diisopropylbenzene hydroperoxide | 0.107 |
| Tert-dodecyl mercaptan | 0.45 |

[1] Inhibitor present, 0.07 weight percent tert-butylcatechol.
[2] Potassium Office Synthetic Rubber Soap.
[3] Sodium salt of condensed alkyl aryl sulfonic acid.

The ingredients in the booster recipe were added when 60 percent conversion was reached. The reaction was continued to 88 percent conversion (total reaction time, 25.5 hours). The reaction was shortstopped with 0.15 part, based on monomers charged, of Goodrite 3955 (50/50 mixture of sodium dimethyldithiocarbamate and sulfur in the form of sodium polysulfide) and 2 parts of phenyl-beta-naphthylamine, based on the polymer, was added as the antioxidant. After stripping, the polymer had a Mooney value (ML-4) of 23.

A carbon black slurry (Philblack A) was prepared in accordance with the following recipe:

| | Parts by weight |
|---|---|
| Water | 900 |
| Philblack A | 100 |
| Marasperse CB (sodium lignin sulfonate) | 2 |
| NaOH | 0.27 |

The butadiene/2-methyl-5-vinylpyridine latex was masterbatched with 20 parts by weight Philblack A per 100 parts rubber using the carbon black slurry prepared as described above. The masterbatch was coagulated by adding it to a sulfuric acid solution. The final pH of the serum was 2.5. One portion of the polymer crumb was given two washes with acid (pH 2.5-3.0) and two washes with water. Another portion of the crumb received two caustic washes with a 2 percent aqueous solution of potassium hydroxide (pH 10.0-11.0) and two washes with water. All washes were done at 160° F. In each case the crumb, after washing, was passed through a Buffalo grinder which produced extruded filaments. The material was then dried in a forced-convection tray drier for 8 hours at 160° F.

Two solid propellants were prepared using the same ratio of ammonium nitrate, binder composition and Milori blue given in Example I. The binder composition for each propellant was as follows:

| | Parts by weight |
|---|---|
| Copolymer | 100 |
| Philblack A [1] | 22 |
| Benzophenone | 20 |
| N,N-dimethyl-S-tert-butylsulfenyl dithiocarbamate | 1 |
| Sulfur | 0.75 |
| Zinc oxide | 3 |
| Aerosol OT [2] | 1 |
| Flexamine [2] | 3 |

[1] Carbon black milled into masterbatch to bring quantity to 22 parts.
[2] As hereinbefore described.

The copolymer and carbon black masterbatch was prepared first, the benzophenone, sulfur, zinc oxide, Aerosol OT and Flexamine were added, then a blend of the ammonium nitrate and Milori blue, and finally the N,N-dimethyl-S-tert-butylsulfenyl dithiocarbamate. In each case a grain was produced by extrusion molding, the material being injected through a die of tubular shape, 3 inches outside diameter and 1.5 inches inside diameter. Curing was effected at 170° F. for 24 hours.

When preparing the propellents, the composition containing the caustic washed polymer crumb was much easier to mix than the composition containing the acid washed crumb. The latter composition was difficult to consolidate and a much more rigorous mixing procedure was necessary than with the composition containing the caustic washed crumb. The mixing time required from the beginning of addition of the ammonium nitrate to the time when it had all been incorporated was 20 minutes with the composition containing the caustic washed polymer crumb but 49.5 minutes was required with the composition containing the acid washed crumb.

Results obtained from various tests on the cured compositions are tabulated below:

| | Composition Containing— | |
|---|---|---|
| | Acid Washed Polymer Crumb | Caustic Washed Polymer Crumb |
| Acid Content, wt. percent | 4.25 | 0.84 |
| Propellent properties: | | |
| Burning rate, in./sec. at 1,000 p.s.i.— | | |
| Strand | 0.175 | 0.199 |
| Motor | 0.147 | 0.182 |
| Pressure exponent (strand) | 0.50 | 0.53 |
| Tensile data— | | |
| Ultimate stress, p.s.i.: | | |
| 70 F | 370 | 320 |
| 170 F | 200 | 135 |
| -75 F | 940 | 1,035 |
| Ultimate elongation, percent: | | |
| 70 F | 19 | 24 |
| 170 F | 16 | 23 |
| -75 F | 15 | |
| Modulus of elasticity, p.s.i.: | | |
| 70 F | 4,700 | 2,700 |
| 170 F | 2,600 | 2,200 |
| -75 F | 9,400 | 7,500 |
| Compression data— | | |
| Ultimate stress, p.s.i.: | | |
| 70 F | 1,260 | 1,280 |
| 170 F | 600 | 550 |
| -75 F | 1,640 | 1,690 |
| Ultimate deformation, p.s.i.: | | |
| 70 F | 35 | 34 |
| 170 F | 28 | 30 |
| Modulus of elasticity: | | |
| 70 F | 10,400 | 9,400 |
| 170 F | 7,000 | 6,100 |
| -75 F | 28,100 | 17,900 |
| Creep, percent reduction in length after 24 hours at 170° F. and under 16 p.s.i. compressive stress | 98 | 97 |

EXAMPLE III

Two solid propellents were prepared using a 20 Mooney (ML-4) 90/10 butadiene/2-methyl-5-vinylpyridine copolymer, prepared by emulsion polymerization at 41° F., in the binder composition. The propellents contained 85 parts by weight ammonium nitrate, 15 parts by weight binder composition, and 2 parts by weight Milori blue. The binder compositions were prepared in accordance with the following formulations:

| | Parts by Weight | |
|---|---|---|
| | 1 | 2 |
| Copolymer | 100 | 100 |
| Philblack A | 20 | 0 |
| Benzophenone | 20 | 20 |
| N,N-dimethyl-S-tert-butylsulfenyldithiocarbamate | 1 | 1 |
| Sulfur | 0.75 | 0.75 |
| Zinc oxide | 3 | 3 |
| Aerosol OT [1] | 1 | 1 |
| Flexamine [1] | 3 | 3 |

[1] As in Example I.

The mixing procedure, production of grains by extrusion molding, and curing were as described in Example II. Tests made on the cured compositions gave the following results (test temperature was 70° F.):

|  | Composition | |
|---|---|---|
|  | 1 | 2 |
| Ballistic data: | | |
| Motor data— | | |
| c*, ft./sec. (characteristic exhaust velocity) | 4,060 | 4,060 |
| r at 1,000 p.s.i., in./sec.[1] | 0.159 | 0.111 |
| Smoke, percent attenuation | 9–12 | 19–36 |
| Strand data— | | |
| r at 1,000 p.s.i., in./sec.[1] | 0.169 | 0.116 |
| n, pressure exponent [1] | 0.54 | 0.61 |
| Mechanical properties: | | |
| Tensile data— | | |
| Ultimate stress, p.s.i. | 335 | 227 |
| Ultimate elongation, percent | 15.5 | 18.4 |
| Young's modulus, percent | 5,550 | 4,375 |
| Compressive creep after one week at 170° F., percent reduction in length— | | |
| 16 p.s.i. stress | 1.4–1.8 | 25.8–28.3 |
| 4 p.s.i. stress | 0.2–0.7 | 5.2–5.6 |

[1] As in Example I.

EXAMPLE IV

Two solid propellants were prepared using a 20 Mooney (ML–4) 90/10 butadiene/2-methyl-5-vinylpyridine copolymer, prepared by emulsion polymerization at 41° F., in the binder composition. The propellants contained 82.5 parts by weight ammonium nitrate, 17.5 parts by weight binder composition, and 2 parts by weight Milori blue. The binder compositions were prepared in accordance with the following formulations:

|  | Parts by Weight | |
|---|---|---|
|  | 1 | 2 |
| Copolymer | 100 | 100 |
| Philblack A | 10 | 20 |
| Benzophenone | 8 | 10 |
| Pentaryl A [1] | 8 | 10 |
| Epichlorohydrin | 6 | 6 |
| Butyl 8 [1] | 2 | 2 |
| Sulfur | 1.75 | 1.75 |
| Zinc oxide | 3 | 3 |
| Aerosol OT [1] | 1 | 1 |
| Flexamine [1] | 3 | 3 |

[1] As in Example I.

Grains were produced by compression molding and curing was effected at 170° F. for 48 hours. Creep data were obtained on each composition, i.e., the percent reduction in length after 7 days at 170° F. and under 16 p.s.i. compressive stress. Results were as follows:

|  | 1 | 2 |
|---|---|---|
| Creep, percent | 12.0 | 3.9 |

Variations and modifications are possible within the scope of the disclosure of the invention, the essence of which is an improved binder composition for a solid propellant comprising a diene-vinylpyridine copolymer having prescribed low values of ash, acid and soap and being within a definite range of Mooney (ML–4) values.

That which is claimed is:

1. A method for preparing a rocket propellant composition of a solid oxidizer consisting of a solid inorganic oxidizing salt, a burning rate catalyst, and a binder comprising polymeric material and carbon black which comprises producing latex by polymerization in aqueous emulsion of a monomeric material containing from about 5 to about 25 percent by weight of at least one $$CH_2=C-R$$

substituted heterocyclic nitrogen base selected from the group consisting of pyridine, quinoline, an alkyl substituted pyridine and an alkyl substituted quinoline, wherein the total number of carbon atoms in the nuclear alkyl substituents is no more than 15 and wherein R is selected from the group consisting of hydrogen and a methyl radical; about 75 to 95 percent by weight of a conjugated diene containing 4 to 6 carbon atoms per molecule; and about 3 to about 10 parts by weight per 100 parts of monomer of an emulsifier, the polymeric material in said latex having a Mooney value (ML–4) within the range of 15 to 30; adding carbon black to said latex in an amount in the range of 10 to 35 parts by weight of carbon black per 100 parts of copolymeric material in said latex; adding sufficient acid to said latex to reduce the pH to a value between 1.5 and 3.5 thereby coagulating the mixture to form a crumb, washing said crumb with an alkaline washing agent for a time sufficient to reduce the soap content of the crumb to a value below 1 weight percent, the acid content of the crumb below a value of 1.5 weight percent and the ash content below a value of 1.5 weight percent, said values being based on the total weight of the carbon black and copolymeric material mixture; drying the washed crumb to a moisture content below 1.5 weight percent; intimately mixing the washed crumb with about 50 to about 90 weight percent of total propellant of solid oxidizer and with about 1 to about 60 parts per 100 parts of said copolymeric material of a burning rate catalyst selected from the group consisting of ammonium dichromate and complex cyanides of iron, copper and nickel; forming said mixture into a propellant grain; and curing said composition in the presence of a curing agent selected from the group consisting of quaternizing agents and vulcanization agents so as to form a rocket propellant.

2. A method in accordance with claim 1 wherein the conjugated diene is butadiene; the heterocyclic nitrogen base is 2-methyl-5-vinylpyridine; the solid oxidizer is ammonium nitrate; and the burning rate catalyst is Milori blue.

3. A method in accordance with claim 1 wherein the conjugated diene is butadiene; the heterocyclic nitrogen base is 2-ethyl-5-vinylpyridine; the solid oxidant is ammonium nitrate; and the burning rate actalyst is Milori blue.

4. A method according to claim 1 wherein the conjugated diene is butadiene; the heterocyclic nitrogen base is 2-vinylpyridine; the solid oxidant is ammonium nitrate; and the burning rate catalyst is Milori blue.

5. The method of claim 1 wherein the conjugated diene is 2-methyl-1,3-butadiene; the heterocyclic nitrogen base is 2-methyl-5-vinylpyridine; the solid oxidizer is ammonium nitrate; and the burning rate catalyst is Milori blue.

6. The method of claim 1 wherein the conjugated diene is 2,3-dimethyl-1,3-butadiene; the heterocyclic nitrogen base is 2-methyl-5-vinylpyridine; the solid oxidizer is ammonium nitrate; and the burning rate catalyst is Milori blue.

7. A method for preparing a rocket propellant composition of solid oxidant consisting of a solid inorganic oxidizing salt, burning rate catalyst, and a polymeric binder material which comprises producing latex by polymerization in aqueous emulsion of monomeric material containing about 5 to about 25 percent by weight of at least one $$CH_2=C-R$$

substituted heterocyclic nitrogen base selected from the group consisting of pyridine, quinoline, an alkyl substituted pyridine and an alkyl substituted quinoline, wherein the total number of carbon atoms in the nuclear alkyl substituents is no more than 15 and wherein R is selected from the group consisting of hydrogen and a methyl radical; about 75 to 95 percent by weight of a conjugated diene containing 4 to 6 carbon atoms per molecule; and about 3 to about 10 parts by weight per 100 parts of monomer of an emulsifier, the polymeric material in said latex having a Mooney value within the range of 15 to 30; adding carbon black to said latex to produce a mixture containing 10 to 35 parts by weight of carbon black per 100 parts of copolymeric material in said latex; adding sufficient strong inorganic acid to said latex to reduce the pH to a value between about 1.5 and 3.5 thereby coagulating the resulting mixture and producing a crumb; washing said crumb with an aqueous solution of an alkali metal hydroxide for a time sufficient to reduce the soap content of the crumb to a value below 1 percent, the acid content of the crumb below a value of 1.5 percent and the ash content below a value of 1.5 percent; washing the thus treated crumb with water; drying the washed crumb to a moisture content below 1.5 percent; intimately admixing said crumb with ammonium nitrate, and Milori blue so as to produce a composition comprising 50 to 80 weight percent ammonium nitrate, 10 to 49 weight percent copolymer binder material and 1 to 10 weight percent Milori blue; forming said composition into a grain; and curing said composition at a temperature in the range of 150 to 200° F. for a time in the range of 24 to 72 hours to produce a rocket propellant.

8. A solid propellant composition consisting essentially of about 50 to about 90 parts by weight of a solid inorganic oxidizing salt per 100 parts of oxidizing salt and binder; about 10 to about 50 parts by weight per 100 parts of oxidizing salt and binder of a binder consisting essentially of a copolymer of a conjugated diene containing 4 to 6 carbon atoms and at least one

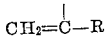

substituted heterocyclic nitrogen base selected from the group consisting of pyridine, quinoline, an alkyl substituted pyridine and an alkyl substituted quinoline, wherein the total number of carbon atoms in the nuclear alkyl substituents is no more than 15, and wherein R is selected from the group consisting of hydrogen and a methyl radical, said copolymer having a soap content not greater than about 1 weight percent, an organic acid content not greater than about 1.5 weight percent and an ash content not greater than about 1.5 weight percent; 0 to about 35 parts by weight of carbon black per 100 parts of copolymer; about 8 to about 20 parts by weight of a rubber plasticizer per 100 parts of copolymer; and about 1 to about 60 parts by weight per 100 parts of copolymer of a burning rate catalyst selected from the group consisting of ammonium dichromate and complex cyanides of iron, copper and nickel.

9. The composition of claim 8 wherein the conjugated diene is butadiene; the heterocyclic nitrogen base is 2-methyl-5-vinylpyridine, the solid oxidizer is ammonium nitrate; and the burning rate catalyst is Milori blue.

10. The composition of claim 8, wherein the conjugated diene is butadiene; the heterocyclic nitrogen base is 2-ethyl-5-vinylpyridine; the solid oxidant is ammonium nitrate; and the burning rate catalyst is ammonium dichromate.

11. A composition according to claim 8 wherein the conjugated diene is butadiene; the heterocyclic nitrogen base is 2-vinylpyridine; the solid oxidant is ammonium nitrate; and the burning rate catalyst is ammonium dichromate.

12. A composition according to claim 8 wherein the conjugated diene is 2-methyl-1,3-butadiene; the heterocyclic nitrogen base is 2-methyl-5-vinylpyridine; the solid oxidant is ammonium nitrate; and the burning rate catalyst is Milori blue.

13. A composition according to claim 8 wherein the conjugated diene is 2,3-dimethyl-1,3-butadiene; the heterocyclic nitrogen base is 2-methyl-5-vinylpyridine; the solid oxidant is ammonium nitrate; and the burning rate catalyst is Milori blue.

No references cited.